Patented Apr. 6, 1926.

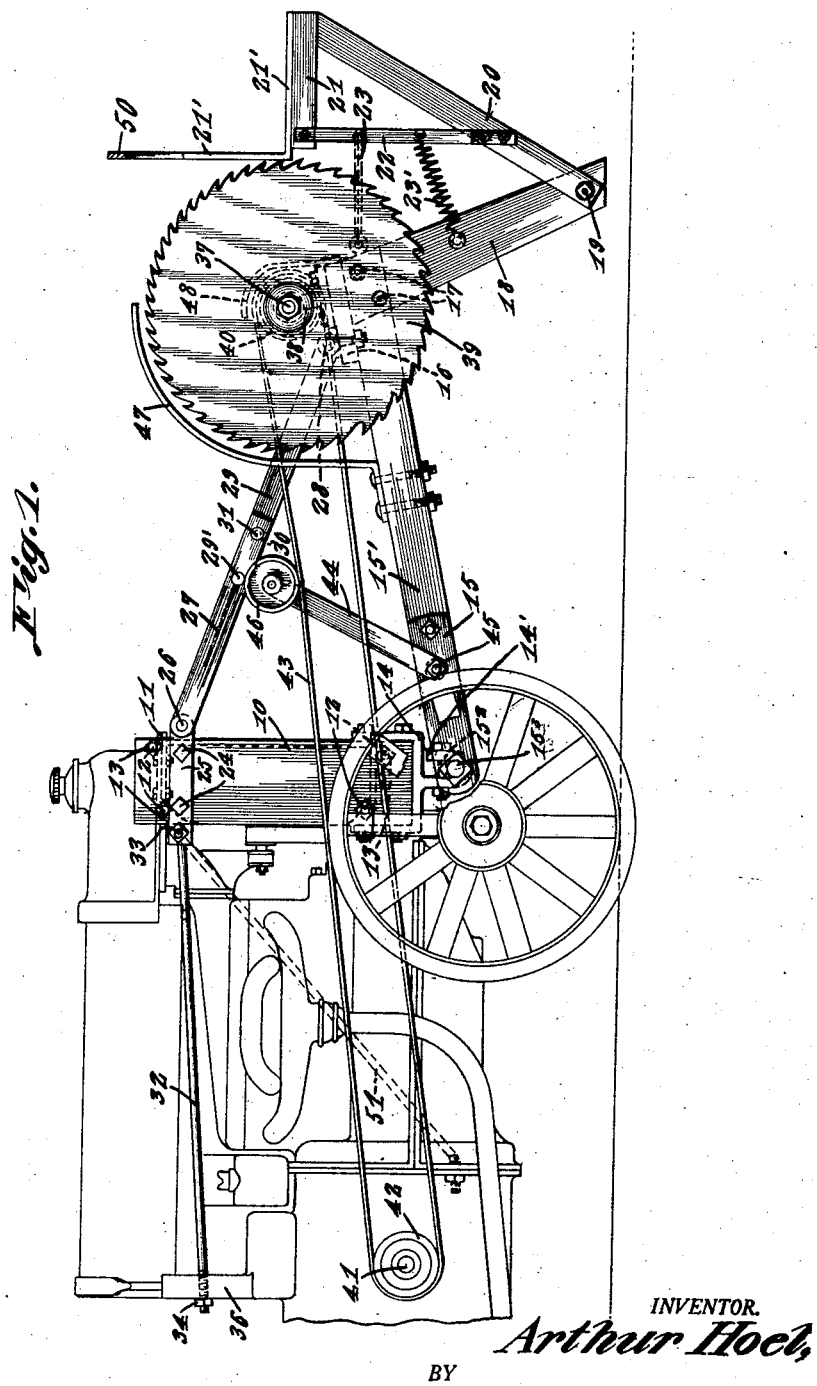

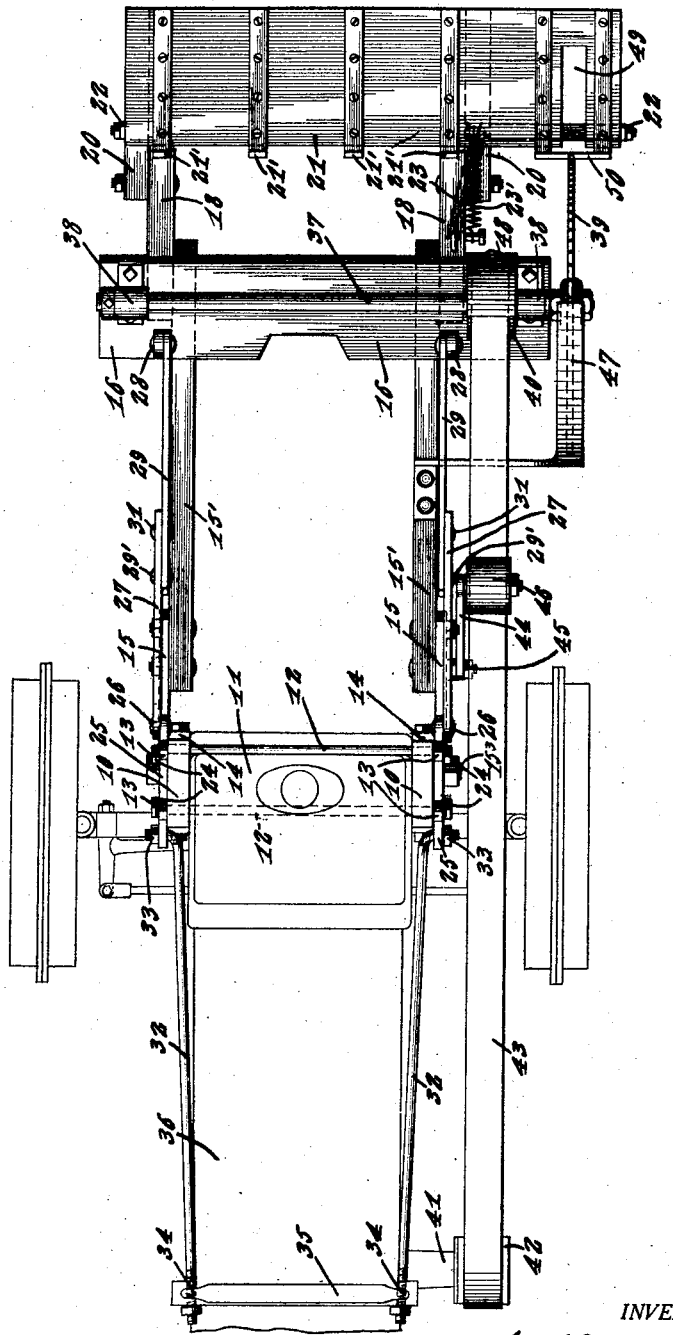

1,580,043

UNITED STATES PATENT OFFICE.

ARTHUR HOEL, OF ORCHARD, IOWA.

TOOL-SUPPORTING ATTACHMENT TO MOTOR-DRIVEN VEHICLES.

Application filed April 20, 1925. Serial No. 24,714.

*To all whom it may concern:*

Be it known that I, ARTHUR HOEL, a citizen of the United States, residing at Orchard, in the county of Mitchell and State of Iowa, have invented certain new and useful Improvements in Tool-Supporting Attachments to Motor-Driven Vehicles, of which the following is a specification.

This invention relates to tool supporting attachments to motor driven vehicles, and has for one of its objects to provide a simply constructed apparatus which may be connected to motor driven vehicles, more particularly to tractors, of various forms and sizes without material structural change in the apparatus and no change whatever in the vehicle to which it is attached.

Another object of the invention is to provide an apparatus of this character which may be projected for use, or disposed in elevated position when not in use, or when the vehicle is being transported.

With these and other objects in view, the invention consists in certain novel features of construction as hereinafter shown and described and then specifically pointed out in the claims, and in the drawings illustrative of the preferred embodiment of the invention.

Figure 1 is a side elevation, and—

Figure 2 is a plan view, of the improved apparatus together with portions of a conventional tractor to which the apparatus is connected.

The improved apparatus includes vertical supporting members 10, bearing against opposite sides of some convenient portion of a tractor, for instance the radiator indicated at 11, and coupled in position by a plurality of clamp rods 12, and clamp units 13.

Attached to the supporting members 10 at the bottom are clip devices 14, having depending open hooks 14', and swinging on each of these hooks by a strap 15 is a bar 15'. The bars 15' are connected together at their outer ends by a transverse support 16. The straps 15 are provided with studs which are indicated at 15³ and engage in the hooks 14'. The studs 15³ are held in position by stop bolts 15².

Rigidly connected by bolts 17 to each of the bars 15' is a depending hanger member 18, and pivoted at 19 to the lower end of each of the members 18 is an upstanding and forwardly inclined supporting members 20. At their upper ends the members 20 are connected to a table member 21, having the inner portion thereof connected to the supporting members 20 by vertical braces, one of which is shown at 22.

Attached to the upper face of the table 21 are L bars 21' which operate to hold the work upon the table.

Means are preferably provided, such as chains or the like, one of which is shown at 23, to limit the outward movement of the table, while leaving it free to swing inwardly toward the member 16, the object to be hereinafter explained. A push spring 23' may also be employed.

Attached by bolts 24 or the like, to the outer faces of the supports 10 are straps 25, and pivoted at 26 to one end of each strap is an inner brace 27, and pivoted at one end at 28 to the support 16, are like braces 29. The braces overlap at confronting portions, and are pivotally united at 29'. Each of the braces 27 is provided with a lateral slot, one of which is shown at 30, and each of the braces 29 is provided with a headed stud 31 to enter the slot when the braces are disposed in longitudinal alinement. By this means the braces hold the bars 15¹, and the hanger member 18, and the supporting table 21 in projected position as shown, and are foldable on the pivots 29' to permit the device to swing on the hooks 14', when it is to be disposed in inoperative position.

As a further means of holding the supports 10 in position, tie rods 32 are employed, and each coupled at one end at 33 to the straps 25 and connected at the other ends at 34 to the clamp member 35 by which the tank 36 of the tractor is supported.

Any required tool element may be mounted on the support 16, but for the purpose of illustration, a conventional saw device is shown comprising a shaft 37 mounted in bearings 38 on the member 16 and carrying a saw 39, and a belt pulley 40. Any suitable portion of the rotative elements of the tractor may be utilized to transmit motion to the shaft 37 and the tool carried thereby, but the tractor selected for illustration is provided with an auxiliary drive shaft 41 carrying a drive pulley 42 in alinement with the pulley 40 on the shaft 37, with a drive belt 43 operating over the pulleys.

A belt tightener element is preferably provided, comprising an arm 44 pivoted at 45 to one of the straps 15 and carrying a pulley 46 engaging the belt.

Guard elements 47 and 48 are arranged over one side of the saw 39 and the belt pulley 40.

The swinging saw table may be manually moved toward the saw 39 carrying the material on the table therewith, against the saw, and swinging outwardly by gravity to its former position when released.

The table 21 is provided with a recess 49 to receive the saw 39, and the bars 21' nearest the opposite sides of the path of the saw are coupled by a transverse head portion 50.

Under some circumstances the tie rods 32 may be located as shown by dotted lines 51, in Fig. 1.

The improved device is simple in construction and can be made of any suitable material.

Preferably the members 10—15—16 and 21 will be of wood, but all parts may be of metal, if required.

The preferred embodiment of the invention is disclosed in the drawings and set forth in the specifications, but it will be understood that modifications within the scope of the claimed invention may be made in the construction without departing from the principle of the invention or sacrificing any of its advantages.

Having thus described my invention what I claim as new is:

1. In an apparatus for the purpose set forth a pair of vertically disposed spaced rectangular supports each adapted to be secured to one side of the body of a mobile vehicle and project forwardly therefrom, a clip element depending from the lower end of each of said supports, upwardly inclined arms having their lower ends pivotally mounted in said clip elements, a depending forwardly inclined hanger having its upper end fixedly secured to the outer end of each of said arms, a transverse support connecting the outer ends of said arms together, a shaft mounted on said support and carrying a tool element, a rear pair of forwardly extending and downwardly inclined brace members having their rear ends pivotally connected with the upper ends of said vertical supports, a forward pair of forwardly extending and downwardly inclined brace members having their forward ends pivotally connected to the rear of said transverse support and their rear ends overlapping and pivotally connected to the forward ends of the first mentioned pair of brace members, and means for detachably coupling the pairs of brace members together for maintaining them in bracing position.

2. In an apparatus for the purpose set forth a pair of vertically disposed spaced rectangular supports each adapted to be secured to one side of the body of a mobile vehicle and project forwardly therefrom, a clip element depending from the lower end of each of said supports, upwardly inclined arms having their lower ends pivotally mounted in said clip elements, a depending forwardly inclined hanger having its upper end fixedly secured to the outer end of each of said arms, a transverse support connecting the outer ends of said arms together, a shaft mounted on said support and carrying a tool element, a rear pair of forwardly extending and downwardly inclined brace members having their rear ends pivotally connected with the upper ends of said vertical supports, a forward pair of forwardly extending and downwardly inclined brace members having their forward ends pivotally connected to the rear of said transverse support and their rear ends overlapping and pivotally connected to the forward ends of the first mentioned pair of brace members, means for detachably coupling the pairs of brace members together for maintaining them in bracing position, an upstanding rearwardly swinging table pivotally connected at its lower end to the lower ends of said hanger members and arranged forwardly of said transverse support, and means connected to the hangers and to said table for arresting the forward swinging movement of said table.

3. In an apparatus for the purpose set forth a pair of vertically disposed spaced supports adapted to be secured to a mobile vehicle, a clip element depending from the lower end of each of said supports, upwardly inclined arms having their lower ends pivotally mounted in said clip elements, a depending hanger having its upper end fixedly secured to the outer end of each of said arms, a transverse support connecting the outer ends of said arms together, a shaft mounted on said support and carrying a tool element, a rear pair of brace members having their rear ends pivotally connected with the upper ends of said vertical supports, a forward pair of brace members having their forward ends pivotally connected to said transverse support and overlapping and pivotally connected to the forward ends of the first mentioned pair of brace members, means for detachably coupling the pairs of brace members together for for maintaining them in bracing position, said brace members when in bracing position suspending the outer ends of said arms and said support, and rearwardly extending tie rods for said vertically disposed supports.

4. An apparatus for the purpose set forth comprising a transverse support, a shaft mounted thereon and carrying a tool element, a frame structure carrying said support and adapted to be pivotally connected at its rear end to a vehicle, foldable bracing means pivotally connected at the forward end thereof to said support and adapted to have the rear end thereof pivotally connected with the vehicle, said bracing means arranged over said supporting frame, and suspending said support and frame, an upstanding spring controlled, rearwardly swinging table arranged forwardly of said transverse support and pivotally connected at the lower end thereof to the forward end of said frame structure, and means connected with the support and with the table for arresting the forward swinging of said table.

5. An apparatus for the purpose set forth comprising a transverse support, a shaft mounted thereon and carrying a tool element, a frame structure having said support secured to the outer end thereof, means for pivotally connecting the rear end of said frame structure to a vehicle, suspension means for said frame structure and support, said means having its forward end pivotally connected to the support and adapted to have its rear end pivotally connected to the vehicle, an upstanding spring controlled rearwardly swinging table arranged forwardly of said support and having its lower end pivotally connected to the lower end of the forward end of said frame structure, and means connected to the forward end of the frame structure and the table for arresting the forward swinging of the table.

In testimony whereof, I affix my signature hereto.

ARTHUR HOEL.